Aug. 21, 1928.

H. B. TAYLOR 1,681,712

HYDRAULIC TURBINE

Filed March 1, 1923      3 Sheets-Sheet 1

Inventor
H. Burchard Taylor
By Edwards, Sager & Bower
his Attorneys

Aug. 21, 1928. 1,681,712
H. B. TAYLOR
HYDRAULIC TURBINE
Filed March 1, 1923 3 Sheets-Sheet 2
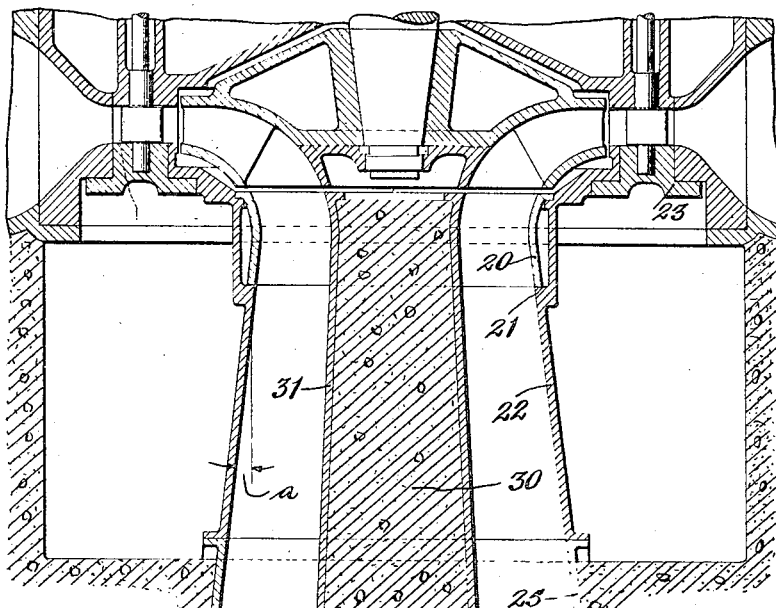
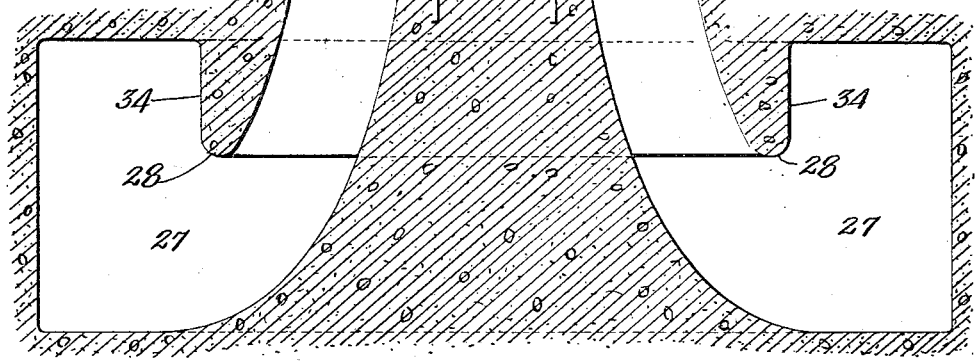
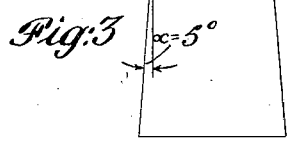
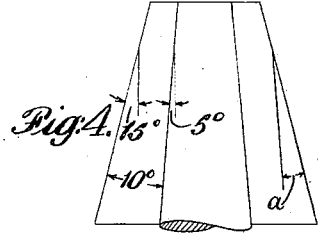

Patented Aug. 21, 1928.

1,681,712

UNITED STATES PATENT OFFICE.

HARVEY BIRCHARD TAYLOR, OF PHILADELPHIA, PENNSYLVANIA.

HYDRAULIC TURBINE.

Application filed March 1, 1923. Serial No. 622,016.

This invention relates to hydraulic turbines of the reaction type and more particularly to one provided with an improved draft tube construction.

In certain turbines of this character where the water leaves the runner with a considerable whirl there is a marked tendency to form a vortex or vacuum at the center of the draft tube immediately beneath the runner. This is due to the centrifugal force which is particularly strong at the center of the whirling mass because the water in this vicinity is being turned through an arc of very small radius. The tendency toward the formation of a vortex is greatest when the turbine is being operated at part gate because of an insufficient supply of water to the runner and a high velocity of whirl in the runner discharge and also when operated at over gate where the water near the axis has a whirl in the opposite direction to the motion of the runner.

According to my present invention I avoid the formation of a vortex by causing all of the whirling flow to be directed along paths having considerable radii of curvature and by limiting the radial thickness of the whirling mass. This I accomplish in the present embodiment of my invention by forming the draft tube with a central core of substantial diameter, the core extending throughout the length of the tube. The whirling flow from the runner is thus confined to the space around the core. The hub of the runner is made of a large diameter so as to cover and conform to the end of the core and the flow passage through the runner is formed as a smooth continuation of the annular passage around the core.

The draft tube constructed in accordance with my invention has a comparatively narrow annular channel. The walls of the channel therefore furnish a more effective guiding surface than is usual with tubes of this character and I am enabled to employ a tube of comparatively short length which will cause a rapid deceleration of flow and turn the water into its proper channel without loss of efficiency as will be more fully explained hereafter.

While draft tubes with cores extending therethrough have heretofore been employed, such cores have been of small diameter and have been used only with relatively short draft tubes, since if a core of small diameter should be used in a long draft tube it would be structurally weak and would be difficult to support rigidly against lateral deflection without recourse to objectionable struts extending across the discharge space below the runner. The core as constructed by me may be supported entirely from its base and thus provide for a discharge passage which is free from obstruction.

I find it desirable to employ a core having a diameter of as much as half that of the outer wall of the draft tube, or even greater in some instances, the diameter of the core depending to some extent on the specific speed of the turbine.

My invention is particularly applicable to turbines of low or moderate specific speed, and for turbines operating under high or moderate heads.

Numerous objects and advantages will appear from the following description taken in connection with the accompanying drawings wherein Fig. 1 is a vertical section on line 1—1 of Fig. 2 and shows one form of turbine embodying my invention.

Fig. 3 is a diagrammatic view of a conical draft tube.

Fig. 4 is a diagrammatic view of an annular draft tube. Figs. 3 and 4 being designed to illustrate certain of the advantages secured by the use of my invention.

Fig. 5 is a fragmentary sectional view showing a runner and draft tube construction which is somewhat different from that shown in Figs. 1 and 2.

Figure 1:
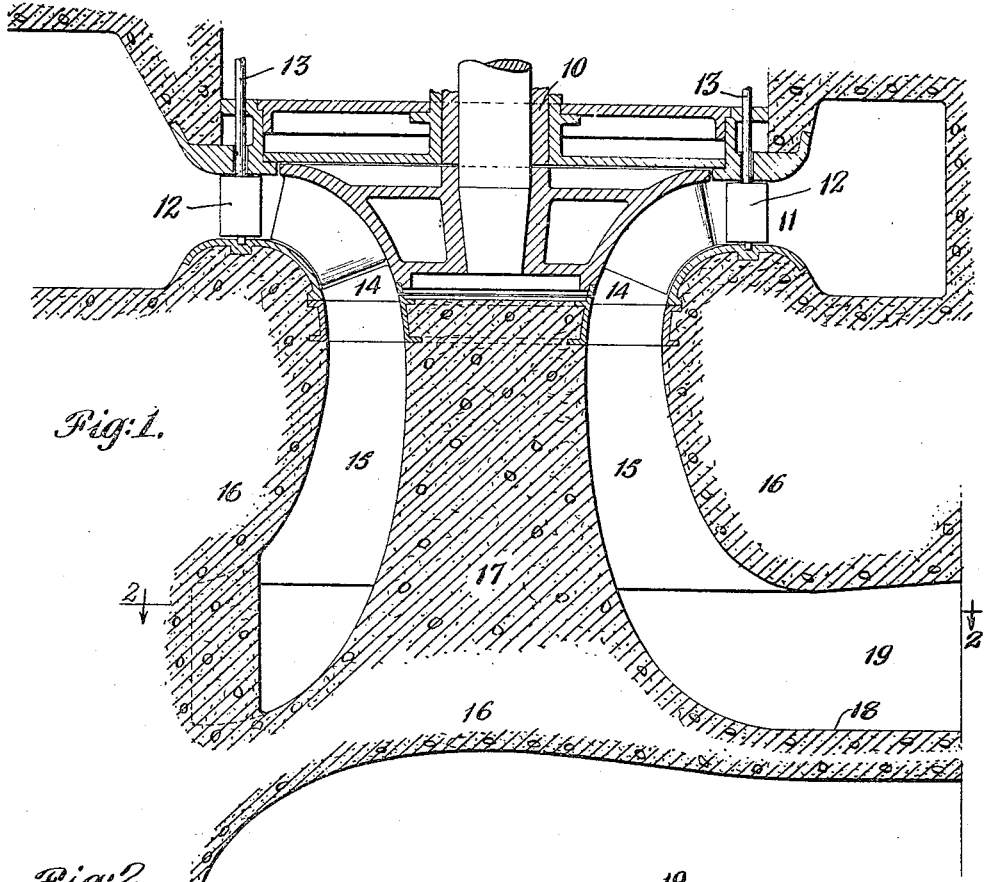
Figure 2:
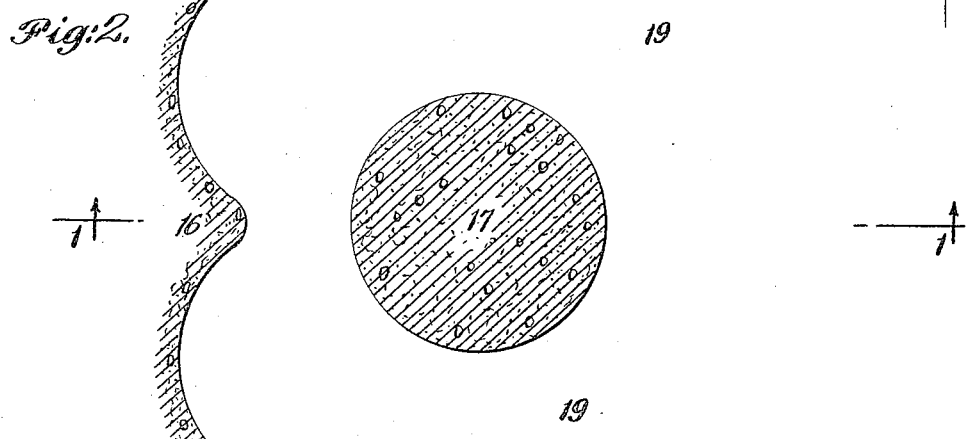
Fig. 2 is a horizontal section on the line 2—2 of Fig. 1.

Referring to Fig. 1 of the drawing the turbine is provided with a runner mounted on a vertical shaft adapted to rotate in suitable bearings 10. The intake passage leading to the runner is of the usual contracting volute form and converges towards the entrance space 11 of the runner. In this entrance space are located adjustable guide vanes or wicket gates 12 adapted to be controlled through their stems 13 by any suitable operating means.

Communicating with the runner passage 14 and adapted to receive flow therefrom is a draft tube 15 formed in the concrete foundation 16 which tube as shown is of an annular form being constructed with a large central concrete core 17 rising from the floor 18 of the collector passage 19. In turbines of low or moderate specific speed the upper diameter of the core 17 would be a considerable proportion of the outside diameter of the tube at its upper end, being made from 1/4 to 1/2 the outside diameter in most cases and still larger in turbines of low specific speed types. Because of the large diameter of the core it is self-supporting, that is, does not require any bracing means extending across the annular passage of the draft tube. The upper end of the core would usually be provided with a metal cap, and when the remainder of the core is built of concrete as shown in the figures, the concrete should contain proper reinforcement to resist lateral deflection and hydraulic uplift. The passage spreads radially outward along smoothly curving lines at the same time increasing in area such that the flow therethrough will receive a continuous deceleration.

It will be noted that the turbine shown in Fig. 1 is of the diagonal inflow type and the surface of the core and outer wall of the tube are formed as smoothly curving continuations of the walls of the passage through the runner. In passing down from the runner both core and outer wall of the tube decrease in diameter somewhat and then increase to the outlet.

The collector passage 19 which is of the double spiral form serves to direct the flow received from the draft tube into a down stream direction. As illustrated this collector also expands in area at such a rate as to further decrease the velocity of flow and thus permit the employment of a short draft tube which is designed to deliver to the collector a flow of considerable velocity.

As illustrative of certain advantages to be gained by the use of a draft tube provided with a core which is of large diameter in comparison with that of the tube reference is had to Figs. 3 and 4 of the drawing. In Fig. 4 which shows diagrammatically an annular draft tube, the angle $\alpha$ represents the angle of divergence between the two walls of the annular space with reference to each other. That is, it is the angle between the outer wall and a line parallel to the inner wall at any given section. In case the wall of the tube is vertically curved this angle would be the angle between the tangents of the curves at the intersection of these walls with a section taken at approximately right angles to the flow down the tube, that is at right angles to the direction of flow, neglecting its whirling component. If no inner core were present in the draft tube so that the tube became a simple cone, the permissible angle between the wall and the axis of the tube should not exceed approximately five degrees if the highest efficiency of conversion of velocity head into pressure head is to be secured in the flow passing through the tube. That is, the angle between opposite walls should not exceed approximately ten degrees. The reason it is necessary to state the value of this angle in an approximate manner is that as the angle is increased the efficiency of energy conversion falls off at an increasing rate and it cannot be stated in general that any limiting angle will apply to all cases. If a sufficient length of draft tube is available, the best angle of divergence for a simple conical tube would be about three degrees between the wall and the axis. This angle can be increased to four degrees or five degrees without materially impairing the efficiency of diffusion, but as the angle is increased beyond this point, the efficiency falls off at an increasing rate.

In an annular form of tube, that is, one containing a large core so that the width of passage between the core and the outer wall is relatively small compared to the mean diameter of the annular space, an element of the passage then approximates to a rectangular passage contained between two parallel plane surfaces. It has been found that a rectangular passage bounded on two sides by parallel plane surfaces will be most efficient as a diffuser when the non-parallel sides diverge at an angle of about ten degrees between these two sides. This angle can be increased to twelve degrees or even fifteen degrees without materially reducing the efficiency of diffusion.

It is therefore seen that if a passage is bounded by two parallel planes, the walls may diverge from each other at a greater angle than can be used between the wall of a conical tube and its axis, or, what is the same thing, between the wall of a conical tube and the surface of a very small cylindrical core at the axis. While the outer and inner walls of an annular tube are not plane surfaces and therefore the space does not correspond exactly to one bounded by two parallel planes, nevertheless if the radii of both walls are large compared to the distance between them, any small elementary portion of the space bounded by two meridian planes may be considered to approximate to that between two parallel plane surfaces and it thus becomes possible in an annular form of tube to use an angle of divergence in the neighborhood of double that permissible with the simple conical tube. If the core is very large compared to the outer wall, the angle of divergence between the two walls could be made as great as twelve or fifteen degrees. With the more moderate proportions of core diameter; for example, with the core about half the diameter of the outer wall, the divergence between the core and outer wall could be made as great as ten degrees without causing undue loss of head, while, as stated above, five degrees is about as great as should be used with a simple conical tube. There is therefore an advantage in using an annular tube in place of a plain conical tube, since the water may be more rapidly decelerated in a given length of tube, when the tube is constructed in annular form, than is possible in the plain conical tube, and this can be done without sacrifice of efficiency of diffusion. The reason for this is that the annular tube provides better guidance for the water owing to the presence of the inner surface.

In Fig. 4 of the drawing I have shown an annular draft tube of the same initial diameter and length as the conical tube shown in Fig. 3, the length in both cases being taken as twice the initial diameter. The plain conical tube shown has an angle of divergence of its wall of five degrees with respect to the axis. In the annular tube, a central core is used having an initial diameter equal to half the diameter of the outer wall. This inner core is given an arbitrary angle of divergence with respect to the axis of five degrees, this value being more dependent on structural considerations, that is, the stability and strength of the central core, than on hydraulic considerations, since a wide variety of angles could be satisfactorily used for this core. The outer wall of the annular tube is given an angle of divergence of ten degrees with respect to the inner wall so that it forms an angle of fifteen degrees with respect to the axis. The ratio of the initial area to the final area for the simple cone is equal to 0.548 for the proportions shown, while the corresponding area ratio for the annular tube is 0.21.

Since the velocity of the water flowing through the tube will vary inversely as the area, the ratio of the final velocity head to the initial velocity head of the water will be equal in each case to the square of the respective area ratios just given. That is, the final velocity head with which the water leaves the plain conical tube will amount to 30% of the velocity head with which the water enters the tube and in the case of the annular tube, the final velocity head will be 4.4% of the entering velocity head. If these two tubes should be applied to a turbine in which the water leaves the runner with a velocity head amounting to 3% of the total effective head on the turbine, a value which corresponds to a turbine of low or moderate specific speed, then if the simple conical tube is used having the proportions shown, the water will be discharged from the tube with a velocity head amounting to 9/10 of 1% of the head on the turbine. In other words, nearly 1% of the available energy will be thrown away into the tailrace. If the annular tube of the given proportions is applied to the same turbine, the velocity head with which the water leaves the tube will amount to only 13/100 of 1% of the effective head, so that only a very small portion of the available energy is thrown away, this figure being about as small as it will ordinarily be economical to secure.

It is to be noted that if the core is of too small a diameter compared to the outer walls, the advantage just described cannot be secured, since the core will not give sufficient guidance to the water to permit the angle of divergence of the outer wall to be made materially greater than about five degrees, but if the central core is of such size that, for example, the annular passage has a width amounting to less than half the mean diameter of the annular space, then the angle of divergence between the outer and inner walls may be increased to a value in the neighborhood of double that permissible with the simple tube. It thus becomes possible by constructing the draft tube of a turbine in this annular form to convert the velocity head with which the water leaves the runner into useful pressure head within a relatively small distance measured along the axis of the turbine.

In Fig. 5 of the drawing illustrating a turbine of low specific speed type the usual spreading draft tube at the lower end of the annular tube is omitted substantially all of the deceleration occurring in the annular tube. In this figure the external wall of the draft tube is formed of an upper metallic section 20 which rests upon a shoulder 21 of an intermediate section 22. This section extends upwardly and is supported by ring 23 located below the runner blades. Embedded in a concrete sub-base 24 is a section 25 which joins the lower end of the intermediate section 22. The intermediate section may be provided with a manhole (not shown) and this together with the space surrounding the sections above described serves as a means for gaining access to the interior of the draft tube for inspection and repair. The remainder of the external wall of the draft tube is formed as a space in the concrete sub-base. The various portions of the external wall above described form a continuous, gradually spreading surface. The collector passage 27 is formed as a space in the concrete and extends upwardly some distance above the lower end of the outer wall of the tube. The outer wall of the tube joins the collector passage 27 in a somewhat sharply curved surface 28.

The core 30 of the tube is of concrete and extends upwardly from the floor of the collector passage. This core is reinforced at its upper portion with a metallic lining 31 which lining is anchored by rods 32 to the concrete of the core. As shown in the figure the core is curved outward into the floor of the horizontal collecting conduit, this being done more for strength and stability of the structure than for hydraulic reasons, since the velocity of the water surrounding the lower portion of this core has been reduced to a low value.

Figure 6:
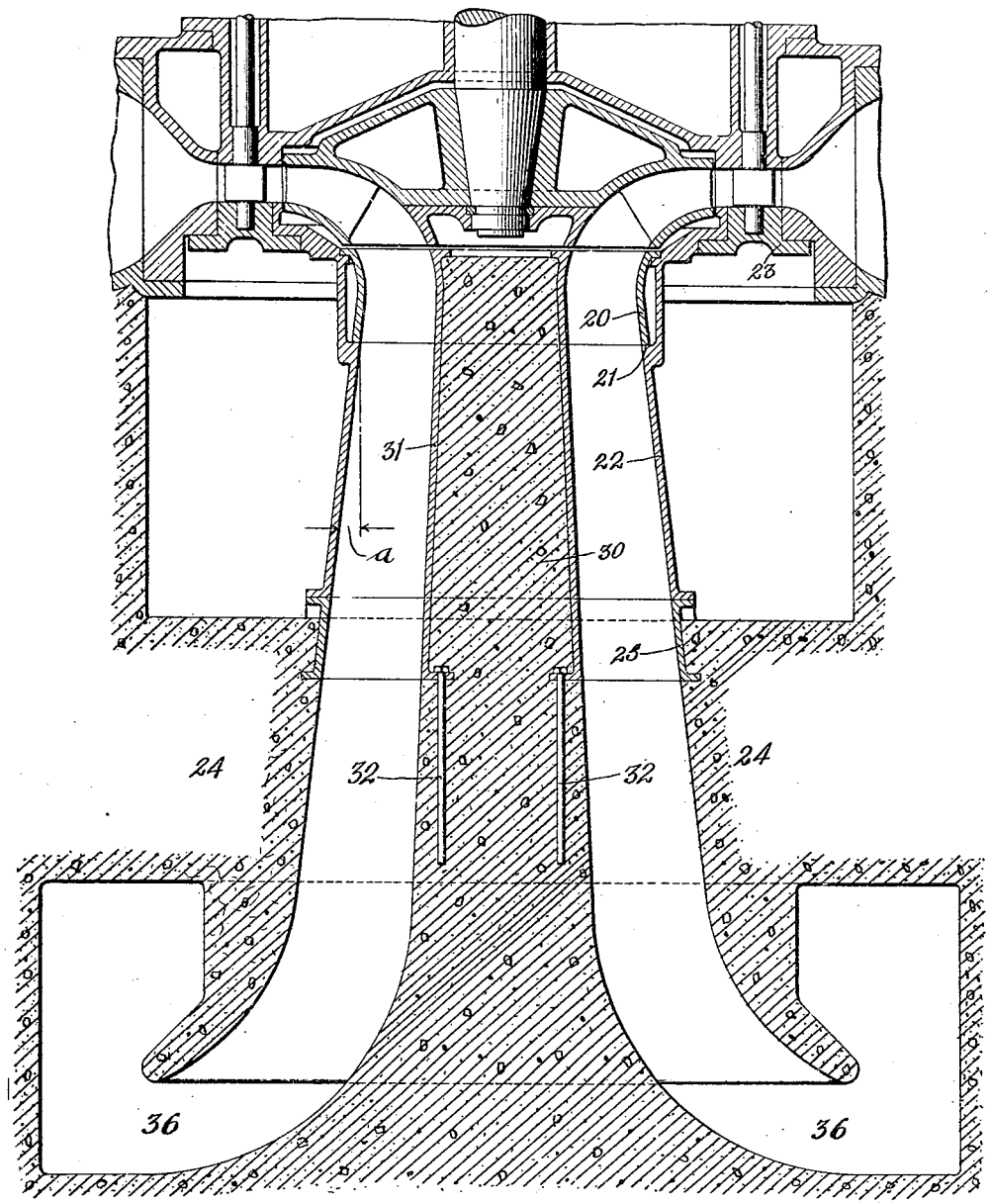
Fig. 6 is a view similar to Fig. 5 but illustrating a still further modification.

Fig. 6 differs from Fig. 5 in that the lower end of the tube is provided with a spreading portion designed to receive flow at a substantial velocity and reduce this velocity to the low value at the outlet 36. The spreading portion curves gradually outward so as to guide the flow smoothly and with a gradual deceleration from an axial to radial directions. Somewhat less velocity head will be discharged by the tube shown in Fig. 6 then by that shown in Fig. 5.

I preferably employ with the construction above described runners having vanes whose transverse width across the flow is not greater than the mean radius of discharge, that is the radial distance from the turbine axis to the centerline of the discharge midway between the inner and outer walls. Due to the fact that these vanes are located some distance from the axis of rotation I am able to employ vanes with but little curvature in sections cut by meridian planes, that is planes containing the runner axis, and still insure that all stream elements whether nearer to or farther from the axis exert nearly the same torque on the runner shaft. Such vanes will present to the stream a surface of relatively small area and so reduce the friction losses to a minimum. Furthermore because of their simplicity of form such vanes are easy to design and produce in the shops.

As shown in Fig. 1, I also propose the use of unshrouded runners for turbines of moderate specific speed such as there shown. The shroud or band of the runner may be omitted in runners of moderate speed type without loss of efficiency and this unshrouded construction reduces the weight of the runner and facilitates its manufacture.

As already pointed out, I have particularly in mind the use of a central core of substantial diameter in the draft tubes of turbines of low and moderate specific speed. This improvement is particularly applicable to turbines having specific speeds of fifty or less in the foot-pound system, such turbines being suited for moderate and high heads; for example, heads of more than about 150 feet. It might be thought that a central draft tube core is called for only for turbines of high specific speeds since the whirling components of the velocity of discharge from the runner are relatively greater in high specific speed turbines. Since, however, the lower specific speed turbines are used under high heads as just mentioned, the whirling components of the runner discharge velocity while relatively small may be absolutely great and a comparatively small obliquity of flow may be sufficient to cause a very material reduction in local pressure along the axis of the usual draft tube. There is therefore frequently a greater tendency for the occurrence of local cavitation and resulting disturbance and vibration in high head turbines than in low. Furthermore, when a low specific speed turbine under a high head is operated at part-gate or over-gate, the velocity of whirl is proportional to the head on the turbine so that whirling velocities involving velocity heads which are very great in comparison with atmospheric pressure may occur under such conditions. The introduction of this central core is therefore of great importance in reducing the risk of cavitation, disturbed flow and resulting corrosion and vibration in reaction turbines operating under high heads.

In the forms of core shown it is to be noted that the minimum diameter thereof is at least one-eighth of the height of the core.

Another important advantage of the form of draft tube which I have shown is the simplification of the powerhouse substructure which can be secured by its use due to the possibility of obtaining the necessary velocity deceleration in a relatively short, straight, annular draft tube of simple construction without the necessity in most cases of employing complex deflecting or collecting passages at the lower end of the tube or in the discharge channel.

It will usually be possibe to form a large part of the core with the surface composed of straight elements, that is, as a simple cone or cylinder, and it will usually be possible to make the outer wall of the draft tube with straight elements for most or all of its length.

I claim:

1. A turbine having a runner discharging the flow with a whirl, and a draft tube comprising an inner and an outer wall forming between them an annular passage which entirely receives said whirling discharge, said inner wall conforming to the flow lines from the inner hub and of substantial diameter at the runner hub at least one fourth of the diameter of said outer wall at the discharge from said runner so that the entire flow from the runner is guided at a sufficiently large radial distance from the turbine axis to prevent the water from attaining high angular velocities of rotation around the axis.

2. A turbine having a runner and outwardly spreading draft tube of continuously increasing area formed by an outer flaring wall and an inner flaring core forming between them an annular passage having an angle of flare between the inner and outer walls of between 10° and 15° as measured in a meridian section, said core being supported at one end alone and extending to the runner at its other end so as to leave said annular passage as a free space adapted to receive and spread a whirling discharge from said runner.

3. A turbine having a runner and formed with an annular passage adapted to receive the entire discharge from said runner the inner diameter of said passage at the runner being at least one half its outer diameter at the runner.

4. A turbine having a runner and an annular draft tube receiving the entire discharge from the runner, the outer diameter of said tube at any transverse section being at most twice the inner diameter.

5. An annular draft tube for a reaction turbine in which the radial width of the annular space between the central core and outer wall is not materially greater than the radius of the core, both the outer wall and the core increasing in diameter in the portions more distant from the runner, the angle of divergence between the outer wall and core not exceeding 15°.

6. Substructure for a hydraulic powerhouse containing a turbine, a draft tube for said turbine and a horizontal discharge passage to receive the flow from said draft tube, said discharge passage having a substantially flat horizontal roof and side walls turning the flow toward final tail water and said draft tube comprising a conical outer wall extending from the turbine to said flat roof, and a conical inner wall or core extending from the floor of said discharge passage upward through the draft tube to the runner of said turbine.

7. Substructure for a hydraulic power house containing a turbine, a draft tube for said turbine and a horizontal discharge passage to receive the flow from said draft tube, said discharge passage having a substantially flat horizontal roof and side walls turning the flow toward final tail water and said draft tube comprising a conical outer wall extending from the turbine to said flat roof, and a conical inner wall or core extending from the floor of said discharge passage upward through the draft tube to the runner of said turbine, the outer draft tube wall being continued in the form of a conical barrel extending downward from the roof of the discharge passage.

8. A turbine having an annular draft tube adapted to receive a downward whirling flow, the central core of said tube being supported at its base alone and the upper end of said core being of a diameter at least half the outer diameter of the draft tube at the runner so as to prevent water flowing through the tube from leaving the core by reason of the centrifugal force due to its whirl.

9. A turbine having an annular spreading draft tube of progressively increasing area adapted to receive a downwardly whirling flow, the central core of said tube being supported at its base alone and the upper end of said core being of a diameter at least half the outer diameter of the draft tube at the runner so as to prevent water flowing through the tube from leaving the core by reason of the centrifugal force due to its whirl.

10. A turbine having a runner of the diagonal inwardly directed flow type and a draft tube having a central core terminating at said runner, the surface of said core being continuous with the inner surface of the passage through the runner and decreasing in diameter below said runner, the diameter of said core at said runner being at least one half the outer diameter of said tube at the runner.

11. A turbine having a runner of the diagonal inwardly directed flow type and a draft tube of progressively increasing area having a central core terminating at said runner, the surface of said core being continuous with the inner surface of the passage through the runner and decreasing in diameter below said runner, the diameter of said core at said runner being at least one half the outer diameter of said tube at the runner.

12. A turbine having an annular draft tube and a runner having vanes of transverse width not greater than the mean radius of the annular flow at the runner discharge.

13. A turbine having a runner formed with vanes of transverse width not greater than the mean radius of the annular discharge therefrom, said vanes having but little curvature in meridian sections.

14. A turbine having a runner formed with vanes of transverse width not greater than the mean radius of the annular discharge therefrom, said vanes having but little curvature in meridian sections and a draft tube having a discharge passage which is annular in form.

15. A turbine having a runner formed with vanes of transverse width not greater than the mean radius of the annular discharge therefrom, said vanes having but little curvature in meridian sections and a draft tube having an annular passage, the internal diameter of which is at least one half its external diameter.

16. A turbine having a runner formed of vanes of transverse width not greater than the mean radius of the annular discharge therefrom and a spreading draft tube having an annular passage of progressively increasing area and of an internal diameter of at least one-half the external diameter.

17. A turbine having a runner and an annular passage adapted to receive the discharge from the runner, the mean radius of a cross section of said passage being at least equal to its radial width between its inner and outer walls at said section.

18. A turbine having a runner and an annular passage adapted to receive the discharge from said runner the average of the external and internal radii of a cross section of said passage being at least equal to the difference of said radii.

19. An annular draft tube in which the difference in the angles at which the inner and outer walls meet a section taken at approximately right angles to the direction of flow, neglecting its whirling components, exceeds 6°, the inner diameter of the tube bearing such a relation to its outer diameter that the flow is decelerated and velocity head converted efficiently into pressure head.

20. An annular draft tube in which the difference in the angles at which the inner and outer walls meet a section taken at approximately right angles to the direction of flow, neglecting its whirling components, exceeds 6°, the inner diameter of the tube bearing such a relation to its outer diameter that the flow is decelerated and velocity head converted into pressure head with at least the efficiency with which said conversion takes places in a conical draft tube having walls inclined to its axis by 5°.

21. An annular draft tube in which the difference in the angles at which the inner and outer walls meet a section taken at approximately right angles to the direction of flow, neglecting its whirling components, exceeds 8°, the inner diameter of the tube bearing such a relation to its outer diameter that the flow is decelerated and velocity head converted into pressure head with at least the efficiency with which said conversion takes place in a conical draft tube having walls inclined to its axis by 5°.

22. An annular draft tube which expands in area at a greater rate than the expansion of a conical tube whose wall is inclined at an angle of 6° to its axis, the inner diameter of the tube being such that the tube will decelerate a flow therethrough and convert velocity head into pressure with at least as great efficiency as this conversion takes place in a conical tube whose wall is inclined to its axis by 5°.

23. An annular draft tube which expands in area at a greater rate than the expansion of a conical tube whose wall is inclined at an angle if 5° to its axis, the inner diameter of the tube being such that the tube will decelerate a flow therethrough and convert velocity head into pressure with at least as great efficiency as this conversion takes place in a conical tube whose wall is inclined to its axis by 4°.

24. An annular draft tube which expands in area at a greater rate than the expansion of a conical tube whose wall is inclined at an angle of 8° to its axis, the inner diameter of the tube being such that the tube will decelerate a flow therethrough and convert velocity head into pressure with at least as great efficiency as this conversion takes place in a conical tube whose wall is inclined to its axis by 5°.

25. A turbine having a runner and formed with an annular passage adapted to receive the discharge from said runner the inner diameter of said passage at the runner being at least one half its outer diameter at the runner, said annular passage expanding at a rate exceeding the expansion of the conical passage whose wall is inclined to its axis at 6°, said annular passage being adapted to decelerate the flow and convert the velocity head into pressure head with an efficiency exceeding that of the conversion in a conical tube whose wall is inclined to its axis by 5°.

26. An annular draft tube for a reaction turbine in which the radial width of the annular space is not materially greater than the radius of the central core formed within it, the said core flaring outward away from the axis at its lowermost portion, the annular passage around said core expanding at a rate exceeding the expansion of a conical passage whose wall is inclined to its axis at 6°, said annular passage being adapted to decelerate the flow and convert the velocity head into pressure head with an efficiency exceeding that of the conversion in a conical tube whose wall is inclined to its axis by 5°.

27. An annular draft tube for a reaction turbine in which the radial width of the annular space is not materially greater than the radius of the central core formed within it, the said core flaring outward away from the axis at its lowermost portion, the annular passage around said core having its outer and inner walls diverging at an angle of less than 15° and expanding at a rate exceeding the expansion of a conical passage whose wall is inclined to its axis at 6°, said annular passage being adapted to decelerate the flow and convert the velocity head into pressure head with an efficiency exceeding that of the conversion in a conical tube whose wall is inclined to its axis by 5°.

28. A hydraulic turbine having a runner and a draft tube, said draft tube being formed in the concrete substructure of the powerhouse and including a central concrete core, reinforcement rods in said core arranged in planes containing the turbine axis and passing downwardly in order to support said core against lateral forces tending to break it off at an intermediate point or to overturn it as a whole, said core extending to the runner at its upper end so as to form a clear annular passage adapted to receive the discharge from the runner.

29. A hydraulic turbine having a runner and a draft tube, said draft tube being formed in the concrete substructure of the powerhouse and including a central concrete core, reinforcement rods in said core located close to the surface of said core throughout its upper portion and passing downwardly in order to support said core against lateral forces tending to break it off at an intermediate point or to overturn it as a whole, said core extending to the runner at its upper end so as to form a clear annular passage adapted to receive the discharge from the runner.

30. A hydraulic turbine having a runner and a draft tube, said draft tube being formed in the concrete substructure of the powerhouse and including a central concrete core, reinforcement rods in said core passing downwardly in order to support said core against lateral forces tending to lift it off said foundation or to overturn it, said core extending to the runner at its upper end so as to form a clear annular passage adapted to receive the discharge from the runner.

31. A substructure for a hydraulic powerhouse containing a turbine, a draft tube for said turbine having a straight portion below the runner and a horizontal discharge passage to receive the flow from said draft tube having a floor with a conical inner wall or core extending upward through the straight portion of the draft tube to the runner of the turbine, the core having a depth from the runner to said floor not more than eight times the minimum diameter of said core.

32. The combination comprising a turbine having a runner and an annular draft tube therefor provided with an outer wall and a core the diameter of which, substantially at the draft tube entrance, is at least equal to the distance between said wall and core, and the length of said draft tube being not greater than substantially three times the minimum diameter of said wall.

33. The combination comprising a turbine having a runner and an annular draft tube therefor provided with an outer wall and a core the diameter of which, substantially at the draft tube entrance, is at least equal to the distance between said wall and core, and the length of said draft tube being not greater than substantially three times the minumum diameter of said wall, and a discharge passage having a floor from which said core extends upwardly substantially adjacent to the runner hub.

34. The combination comprising a turbine having a runner and an annular draft tube therefor provided with an outer wall and a core the diameter of which, substantially at the draft tube entrance, is at least equal to the distance between said wall and core, said core and wall being relatively diverged with the outer wall disposed at an angle with respect to the runner axis of not more than substantially 20°.

35. The combination comprising a turbine having a runner and an annular draft tube therefor provided with an outer wall and a core, both of which cooperate to decelerate the flow which completely fills the draft tube passage, said core having at a point intermediate its ends a minimum diameter at least equal to the distance between said core and wall.

36. The combination comprising a turbine having a runner and an annular draft tube therefor provided with an outer wall and a core, both of which cooperate to decelerate the flow which completely fills the draft tube passage, said core having its minimum diameter at a point intermediate its ends and adjacent its uppermost portion, said minimum diameter being at least equal to the distance between said core and wall.

37. The combination comprising a turbine having a runner provided with a hub having blades extending therefrom, and an annular draft tube for said turbine provided with an outer wall and a core, the surface of which constitutes substantially a smooth continuation of the hub surface, and said core adjacent said hub having a greater diameter than at a cross-section intermediate the core ends, the minimum diameter of said core being at least equal to the distance between said core and said outer wall in a plane containing said minimum diameter.

38. An annular draft tube having inner and outer relatively diverging walls in which the difference in the angles at which the inner and outer walls meet a plane perpendicularly to the draft tube axis exceeds 6°, the inner diameter of the tube bearing such a relation to its outer diameter that the flow is decelerated and velocity head converted efficiently into pressure head.

HARVEY BIRCHARD TAYLOR.